United States Patent
Mamtimin et al.

(10) Patent No.: US 11,681,070 B2
(45) Date of Patent: Jun. 20, 2023

(54) THREE-COMPONENT HOLDUP MEASUREMENT USING PULSED NEUTRON TOOL

(71) Applicant: Halliburton Energy Services, Inc., Houston, TX (US)

(72) Inventors: Mayir Mamtimin, Spring, TX (US); Jeffrey James Crawford, Katy, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 17/334,271

(22) Filed: May 28, 2021

(65) Prior Publication Data
US 2022/0171088 A1 Jun. 2, 2022

Related U.S. Application Data

(60) Provisional application No. 63/119,090, filed on Nov. 30, 2020.

(51) Int. Cl.
*G01V 5/10* (2006.01)

(52) U.S. Cl.
CPC .................. *G01V 5/105* (2013.01)

(58) Field of Classification Search
CPC ......... G01V 5/105; G01V 5/12; G01N 33/383
See application file for complete search history.

(56) References Cited

U.S. PATENT DOCUMENTS

| | | |
|---|---|---|
| 4,378,295 A | 3/1983 | Axtmann |
| 5,406,078 A | 4/1995 | Jacobson |
| 5,536,938 A * | 7/1996 | Mills ............... G01V 5/10 250/269.4 |
| 7,292,942 B2 | 11/2007 | Ellis et al. |
| 2010/0292927 A1 | 11/2010 | Jacobson et al. |
| 2011/0202276 A1 | 8/2011 | Truax et al. |

(Continued)

FOREIGN PATENT DOCUMENTS

WO 2011152924 12/2011

OTHER PUBLICATIONS

Galford, J., Truax, J., Hrametz, A., & Haramboure, C. (2009). A new neutron-induced gamma-ray spectroscopy tool for geochemical logging. SPWLA 50th Annual Logging Symposium 2009, 1-14 (Accessed Jun. 4, 2021).

(Continued)

*Primary Examiner* — David P Porta
*Assistant Examiner* — Fani Polyzos Boosalis
(74) *Attorney, Agent, or Firm* — John Wustenberg; C. Tumey Law Group PLLC (57) ABSTRACT

Systems and methods may utilize information collected by a pulsed-neutron logging tool along with modeling a characterization of a borehole to form a 3-stage correction algorithm. This algorithm may be used to find an oil, water, and gas holdup in the borehole. During operations, a pulsed neutron logging tool which emits neutrons to interact with nuclei inducing gamma radiation. The gamma radiation is detected into a response which may be correlated to the location of a holdup in a borehole by using the entire spectrum or ratios of selected peaks. In examples, a borehole density index may be implemented to complement the response and improve accuracy and measurement confidence.

20 Claims, 3 Drawing Sheets

(56) References Cited

U.S. PATENT DOCUMENTS

| | | |
|---|---|---|
| 2011/0282818 A1 | 11/2011 | Chen et al. |
| 2013/0105680 A1 | 5/2013 | Guo et al. |
| 2014/0374582 A1* | 12/2014 | Guo .................. G01V 5/125 |
| | | 250/269.3 |
| 2015/0083905 A1 | 3/2015 | Jacobson et al. |
| 2015/0108339 A1 | 4/2015 | Guo et al. |
| 2016/0216400 A1 | 7/2016 | Navarro-Sorroche et al. |
| 2016/0238736 A1 | 8/2016 | Guo et al. |
| 2016/0299251 A1 | 10/2016 | Luo et al. |
| 2017/0089846 A1 | 3/2017 | Guo et al. |
| 2017/0145821 A1 | 5/2017 | Hu et al. |
| 2017/0167243 A1 | 6/2017 | Guo et al. |
| 2017/0199298 A1 | 7/2017 | Hu et al. |
| 2017/0211382 A1 | 7/2017 | Jacobson et al. |
| 2018/0038990 A1 | 2/2018 | Hu et al. |
| 2018/0210109 A1 | 7/2018 | Guo et al. |
| 2018/0245451 A1 | 8/2018 | Hu et al. |
| 2018/0246250 A1 | 8/2018 | Navarro Sorroche et al. |
| 2018/0267200 A1 | 9/2018 | Hu et al. |
| 2018/0292204 A1 | 10/2018 | Lee et al. |
| 2018/0329109 A1 | 11/2018 | Navarro Sorroche et al. |
| 2019/0010800 A1 | 1/2019 | Hu et al. |
| 2019/0056525 A1 | 2/2019 | Hu et al. |
| 2020/0109626 A1 | 4/2020 | Hu et al. |
| 2020/0199995 A1 | 6/2020 | Hu et al. |

OTHER PUBLICATIONS

Hertzog, R.C. (1980). Laboratory and Field Evaluation of an Inelastic Neutron Scattering and Capture Gamma Ray Spectrometry Tool. Society of Petroleum Engineers Journal, 20(5), 327-340 (Accessed Jun. 4, 2021).

Evans, et al., Iioli,. [Society of Petroleum Engineers SPE Annual Technical Conference and Exhibition—San Antonio, Texas, USA (Oct. 8, 2012)] SPE Annual Technical Conference and Exhibition—Sourceless Neutron-Gamma Density (SNGD): A Radioisotope-Free Bulk Density Measurement: Physics Principles, Environmental Effects, and Applications (Accessed Jun. 4, 2021).

Peeters, M., (1994). Pulsed neutron tools applied to three-phase production-logging in horizontal wells. SPWLA 35th Annual Logging Symposium 1994. Available at https://onepetro.org/SPWLAALS/proceedings-abstract/SPWLA-1994/All-SPWLA-1994/SPWLA-1994-L/19241, Accessed May 26, 2021.

TFrcka, Darryl; van den Berg, Frans; Manan, W.A.; Peeters, Max; Mickael, Medhat (). [Society of Petroleum Engineers SPE Annual Technical Conference and Exhibition—Denver, Colorado (Oct. 6, 1996)] SPE Annual Technical Conference and Exhibition—Measuring Three-Phase Holdups in Horizontal Wellbores Using Pulsed Neutron Instruments.

Roscoe, Bradley A. (). [Society of Petroleum Engineers International Conference on Horizontal Well Technology—Calgary, Alberta, Canada (Nov. 18, 1996)] International Conference on Horizontal Well Technology—Three-Phase Holdup Determination in Horizontal Wells Using a Pulsed-Neutron Source.

Schlumberger, RSTPro, Jul. 2006.

Halliburton, Nuclear Magnetic Resonance (NMR) Logging, Xaminer Magnetic Resonance (SMR) Service, High-Resolution, High-Efficiency, New NMR Technology, HO12700, May 2018.

Halliburton, Well Integrity Services You Can Trust, HO13826, Apr. 2021.

\* cited by examiner

THREE-COMPONENT HOLDUP MEASUREMENT USING PULSED NEUTRON TOOL

BACKGROUND

Operators of existing wells often track borehole holdup, especially in horizontal wellbores. Holdup is defined as a reference to multiphase flow in pipes, the fraction of a particular fluid present in an interval of pipe. In multiphase flow, each fluid moves at a different speed due to different gravitational forces and other factors, with the heavier phase moving slower, or being more held up, than the lighter phase. The holdup of a particular fluid is not the same as the proportion of the total flow rate due to that fluid, also known as the fluids "cut." To determine in-situ flow rates, it is necessary to measure the holdup and velocity of each fluid. Borehole holdup measures the volumetric ratios of oil, water, and gas components in a wellbore.

Holdup may be measured by a variety of logging tools, however a pulsed-neutron logging tool may be a primary tool used for holdup measurements. One of the main challenges in reservoir evaluation, when using a pulsed neutron logging tool, is to correct the tool response by subtracting the effect of borehole holdup. Accurate knowledge of borehole holdup content directly determines the accuracy of oil saturation in the formation. Additionally, in horizontal production wells it is important to accurately measure the holdup to determine the flow. Traditional holdup measurement tools, such as pulsed neutron logging tool, fail in horizontal wells because of fluid/gas segregation due to gravity. Existing Pulsed neutron logging (PNL) based holdup techniques lack the accuracy, generality, and applicability to wide range of borehole variations and reservoir conditions.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for determining a neutron-based three-component algorithm that identifies oil, water, and/or gas holdup in a borehole. These systems and methods may utilize information collected by a pulsed-neutron logging tool along with borehole characterization modeling to form a 3-stage correction algorithm. This algorithm may be used to find an oil, water, and/or gas holdup in the borehole. As discussed below, a pulsed neutron logging tool emits neutrons to interact with nuclei of any material to induce gamma radiation. The gamma radiation is detected, which may be used to identify the location of a holdup in a borehole. This may be performed by using the entire spectrum or ratios of selected peaks in acquired measured data sets. In examples, a borehole density index may also be implemented to complement the response and improve accuracy and measurement confidence.

Methods described below may be continuous solutions (non-discrete) for different borehole and formation variations such as hole size, casing size, standoff, porosity, oil saturation, and lithology. This may allow for the establishment of a correlation between measurements and characteristics in the borehole to identify a holdup. Methods may use an entire gamma spectrum, characteristic gamma peaks or peak-ratios, and/or multiple detectors and corroborative methods. Characterization of borehole variations take into account borehole size (OH and CH), casing size (CH), and tool standoff (OH and CH). This may allow methods to isolate and compensate for effects from a formation and determine porosity, saturation, and lithology. The methods and systems may also be guided by physics and interaction mechanism and implemented using machine learning and neural networks. The final integrated holdup answer is cross checked with a borehole density index to form a two-component holdup (oil and water) or a three-component holdup (oil, water, and gas).

Figure 1:
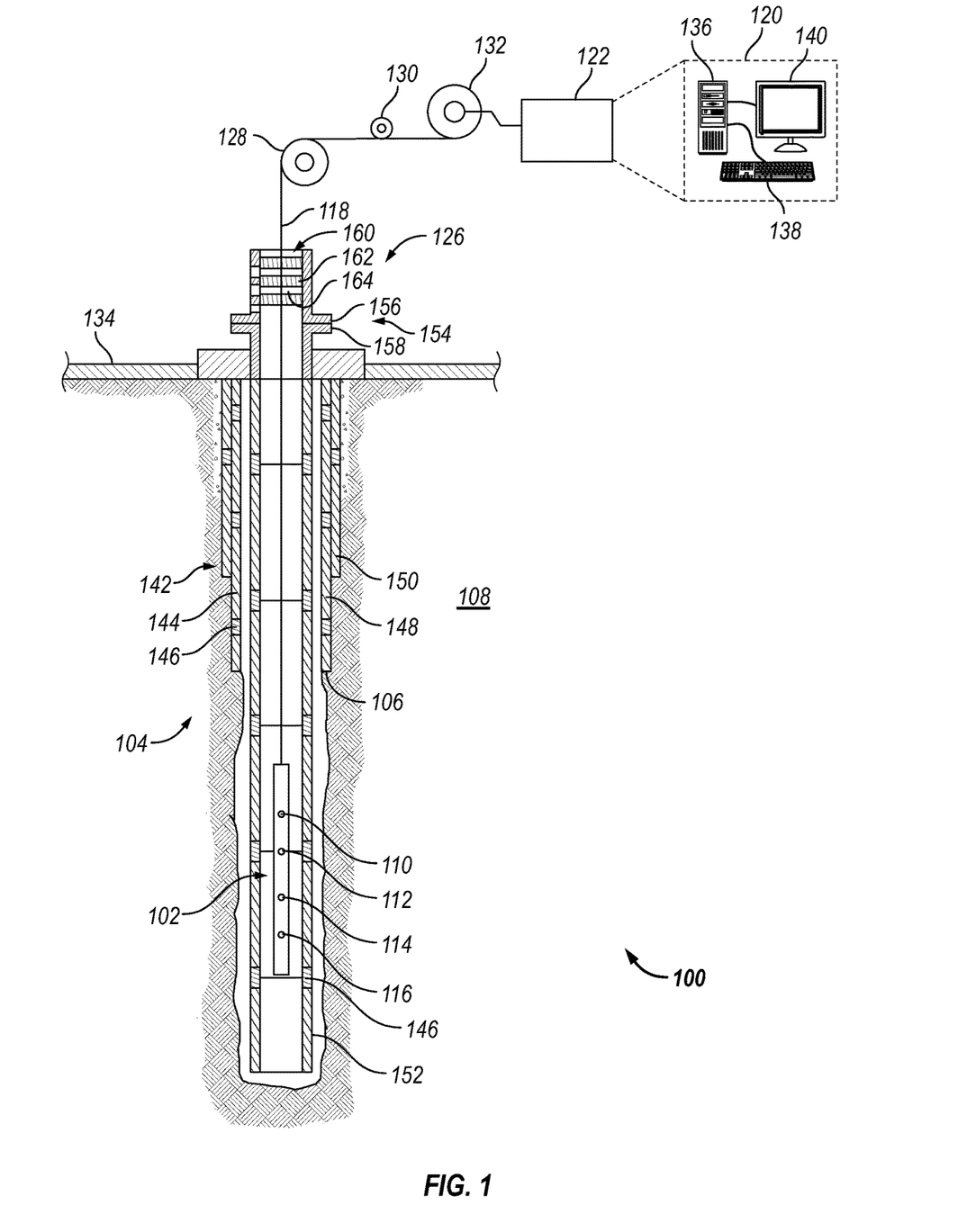
FIG. 1 illustrates a downhole tool in a wireline configuration, in accordance with examples of the present disclosure.

FIG. 1 illustrates logging/measuring operation 100, as disclosed herein, utilizing a pulsed-neutron logging tool 102. FIG. 1 illustrates a cross-section of borehole 104 with a pulsed-neutron logging tool 102 traveling through well casing 106. Borehole 104 may traverse through formation 108 as a vertical well and/or a horizontal well. Pulsed-neutron logging tool 102 contains a neutron source 110, a first neutron detector 112, a second neutron detector 114, and a gamma ray detector 116. Pulsed-neutron logging tool 102 is suspended by a conveyance 118, which communicates power from a logging facility 120 to pulsed-neutron logging tool 102 and communicates telemetry from pulsed-neutron logging tool 102 to information handling system 122. In examples, pulsed-neutron logging tool 102 may be operatively coupled to a conveyance 118 (e.g., wireline, slickline, coiled tubing, pipe, downhole tractor, and/or the like) which may provide mechanical suspension, as well as electrical connectivity, for pulsed-neutron logging tool 102. Conveyance 118 and pulsed-neutron logging tool 102 may extend within casing string 142 to a desired depth within borehole 104. Conveyance 118, which may include one or more electrical conductors, may exit wellhead 126, may pass around pulley 128, may engage odometer 130, and may be reeled onto winch 132, which may be employed to raise and lower the tool assembly in borehole 104. The position of pulsed-neutron logging tool 102 may be monitored in a number of ways, including an inertial tracker in pulsed-neutron logging tool 102 and a paid-out conveyance length monitor in logging facility 120 (e.g., an idler wheel on the wireline cable).

Multiple such measurements may be desirable to enable the system to compensate for varying cable tension and cable stretch due to other factors. Information handling system 122 in logging facility 120 collects telemetry and position measurements and provides position-dependent logs of measurements from pulsed-neutron logging tool 102 and values that may be derived therefrom.

Pulsed-neutron logging tool 102 generally includes multiple instruments for measuring a variety of downhole parameters. Wheels, bow springs, fins, pads, or other centralizing mechanisms may be employed to keep pulsed-neutron logging tool 102 near the borehole axis during measurement operations. During measurement operations, generally, measurements may be performed as pulsed-neutron logging tool 102 is drawn up hole at a constant rate. The parameters and instruments may vary depending on the needs of the measurement operation.

Pulsed-neutron logging tool 102 operates by generating pulses of high energy neutrons that radiate from neutron source 110 into the surrounding environment including borehole 104 and formation 108. The highly energetic neutrons entering the surrounding environment interact with atomic nuclei, inducing gamma radiation. The induced gamma rays may be recorded as a scattering rate (and hence the rate of energy loss) and are generally dominated by the concentration of hydrogen atoms. Induced gamma rays and neutrons may be recorded by first neutron detector 112, second neutron detector 114, and/or gamma ray detector 116. As the presence of hydrogen is primarily attributable to the presence of water or hydrocarbon fluids, the rate of energy loss and gamma spectrum may yield accurate knowledge of borehole holdup. Accurate knowledge of the borehole holdup determines the accuracy of oil saturation in the formation as well as determining the flow in horizontal production wells.

Measurements taken by pulsed-neutron logging tool 102 may be gathered and/or processed by information handling system 122. For example, signals recorded by pulsed-neutron logging tool 102 may be sent to information handling system 122 where they may be stored on memory and then processed. The processing may be performed real-time during data acquisition or after recovery of pulsed-neutron logging tool 102. Processing may alternatively occur downhole on an information handling system 101 disposed on pulsed-neutron logging tool 102 or may occur both downhole and at surface. In some examples, signals recorded by pulsed-neutron logging tool 102 may be conducted to information handling system 122 by way of conveyance 118. Information handling system 122 may process the signals, and the information contained therein may be displayed for an operator to observe and stored for future processing and reference. Information handling system 122 may also contain an apparatus for supplying control signals and power to pulsed-neutron logging tool 102.

As noted above, systems and methods of the present disclosure may be implemented, at least in part, with information handling system 122. While shown at surface 134, information handling system 122 may also be located at another location that is remote from borehole 104. In examples information handling system 122 may be disposed on pulsed-neutron logging tool 102, which may allow for processing to occur downhole. Additionally, on or more information handling systems 122 may be utilized during measurement operations. In such examples, a first information handling system 122 may be at surface 134 and a second information handling system 122 may be disposed on pulsed-neutron logging tool 102 downhole. Information handling system 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 122 may be a processing unit 136, a network storage device, or any other suitable device and may vary in size, shape, performance, functionality, and price. Information handling system 122 may include random access memory (RAM), one or more processing resources such as a central processing unit (CPU) or hardware or software control logic, ROM, and/or other types of nonvolatile memory. Additional components of the information handling system 122 may include one or more disk drives, one or more network ports for communication with external devices as well as an input device 138 (e.g., keyboard, mouse, etc.) and video display 140. Information handling system 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a typical casing string 142 may extend from wellhead 126 at or above ground level to a selected depth within borehole 104. Casing string 142 may comprise a plurality of joints 144 or segments of casing string 142, each joint 144 being connected to the adjacent segments by a collar 146. There may be any number of layers in casing string 142. For example, a first casing 148 and a second casing 150. It should be noted that there may be any number of casing layers. FIG. 1 also illustrates a typical pipe string 152, which may be positioned inside of casing string 142 extending part of the distance down borehole 104. Pipe string 152 may be production tubing, tubing string, casing string, or other pipe disposed within casing string 142. Pipe string 152 may comprise concentric pipes. It should be noted that concentric pipes may be connected by collars 146. Pulsed-neutron logging tool 102 may be dimensioned so that it may be lowered into borehole 104 through pipe string 152, thus avoiding the difficulty and expense associated with pulling pipe string 152 out of borehole 104. In examples, cement (not illustrated) may be disposed on the outside of pipe string 152. Cement may further be disposed between pipe string 152 and casing string 142. It should be noted that cement may be disposed between any number of casings, for example between first casing 148 and second casing 150.

In logging systems, such as, for example, logging systems utilizing the pulsed-neutron logging tool 102, a digital telemetry system may be employed, wherein an electrical circuit may be used to both supply power to pulsed-neutron logging tool 102 and to transfer data between information handling system 122 and pulsed-neutron logging tool 102. A DC voltage may be provided to pulsed-neutron logging tool 102 by a power supply located above ground level, and data may be coupled to the DC power conductor by a baseband current pulse system. Alternatively, pulsed-neutron logging tool 102 may be powered by batteries located within the downhole tool assembly, and/or the data provided by pulsed-neutron logging tool 102 may be stored within the downhole tool assembly, rather than transmitted to the surface during logging (corrosion detection).

With continued reference to FIG. 1, wellhead 126 is described. Wellhead 126 allows for entry into borehole 104, such as the placement of pulsed-neutron logging tool 102 into pipe string 152. In examples, wellhead 126 may include a lubricator head 154 may comprise a lubricator head flange 156 which may be coupled to and sealed with lubricator body flange 158. Lubricator head 154 comprises sealing cartridge 160. Sealing cartridge 160 may be removable from lubricator head 154. Sealing cartridge 160 may be a container comprising a plurality of sealing elements 162 and lubricator cavities 164. Sealing elements 162 may comprise, but are not limited to, elastomeric materials, thermoplastic materials, thermosetting materials, composites thereof, or combinations thereof. Sealing elements 162 comprise an inner diameter to allow for pulsed-neutron logging tool 102, conveyance 118, wireline, coiled tubing, and/or the like to be disposed into borehole 104. Sealing elements 162 form a seal around conveyance 118 (or tubing if provided). Sealing elements 162 are selected such that the length of the diameter of the inner diameter is able to sufficiently seal around conveyance 118. In some example methods, a sealing cartridge 160 comprising a plurality of sealing elements 162 of one size may be removed if desired and exchanged for a different sealing cartridge 160 comprising a plurality of sealing elements 162 of a different size if desired. For example, if a wireline operation requires sealing elements 162 of a first size, upon completion of said wireline operation, the sealing cartridge 160 comprising the sealing elements 162 of a first size may be removed from lubricator head 154 and replaced with a second sealing cartridge 160 comprising sealing elements 162 of a second size to perform a subsequent operation, for example a tripping operation.

Figure 2:
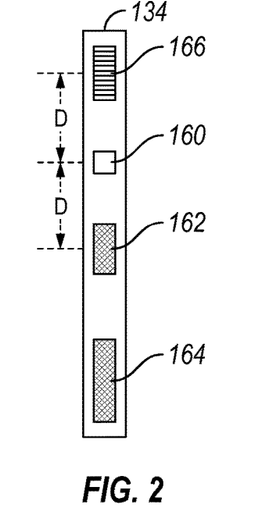
FIG. 2 is a diagram of illustrative embodiments of a pulsed-neutron logging tool.

FIG. 2 shows a first illustrative setup of pulsed-neutron logging tool 102 having a pulsed neutron source 110 that is positioned equidistant from a gamma ray detector 166 and a first neutron detector 112. In examples, pulsed neutron source 110 may be replaced with a continuous neutron source such as Americium-Beryllium (Am—Be) chemical source. Pulsed-neutron logging tool 102 may also include a second neutron detector 114. The two neutron detectors 112 and 114 may be, respectively, termed the "near" and "far" neutron detectors. "Near" being the closest neutron detector to pulsed neutron source 110 and "far" being the furthest neutron detector from pulsed neutron source 110. Neutron detectors 112 and 114 may be designed to count thermal (around about 0.025 eV) and/or epithermal (between about 0.1 eV and 100 eV) neutrons. Suitable neutron detectors include Helium-3 (He-3) filled proportional counters, though other neutron counters may also be used. To improve tool performance, each neutron detector 112 and/or 114 may be implemented as a bank of individual detection devices. In accordance with standard neutron porosity tool measurement techniques, the ratio of far-to-near neutron detector counts is indicative of formation porosity.

With continued reference to FIG. 2 gamma ray detector 166 may be implemented as a scintillation crystal coupled to a photomultiplier tube. As with neutron detectors 112 and/or 114, gamma ray detector 166 may be implemented as a bank of individual detection devices whose results are aggregated. In FIG. 2, gamma ray detector 166 is "co-distant" with the near neutron detector 112, i.e., it is positioned at the same distance D from neutron source 110 as near neutron detector 112. As illustrated in FIG. 2, gamma ray detector 166 and first neutron detector 112 may be located in opposite directions from neutron source 110.

Figure 3A:
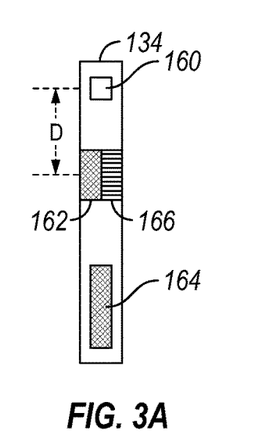
FIG. 3A-3B are diagrams of alternative embodiments of a pulsed-neutron logging tool.

As discussed above, FIGS. 3A and 3B illustrate alternative embodiments of pulsed-neutron logging tool 102. FIG. 3A shows an alternative example in which pulsed-neutron logging tool 102 that has a gamma ray detector 166 and a near neutron detector 112 co-located, i.e., located side-by-side at the same distance D from the neutron source 110.

Figure 3B:
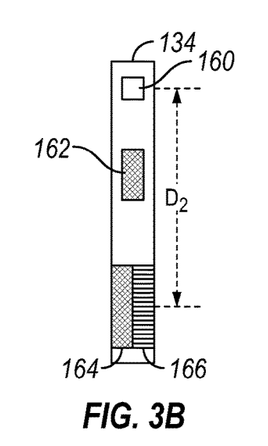

FIG. 3B shows yet another alternative example in which pulsed-neutron logging tool 102 has a gamma ray detector 166 and a far neutron detector 114 co-located at a distance D2 from neutron source 110.

Multiple neutron detectors 112, 114 of pulsed-neutron logging tool 102, enable pulsed-neutron logging tool 102 to measure formation porosity using any of the existing multiple-spacing techniques. In addition, the presence of gamma ray detector 166 having a common distance from neutron source 110 with one of the neutron detectors 112 or 114, enables the measurement of borehole holdup, discussed below.

Figure 4:
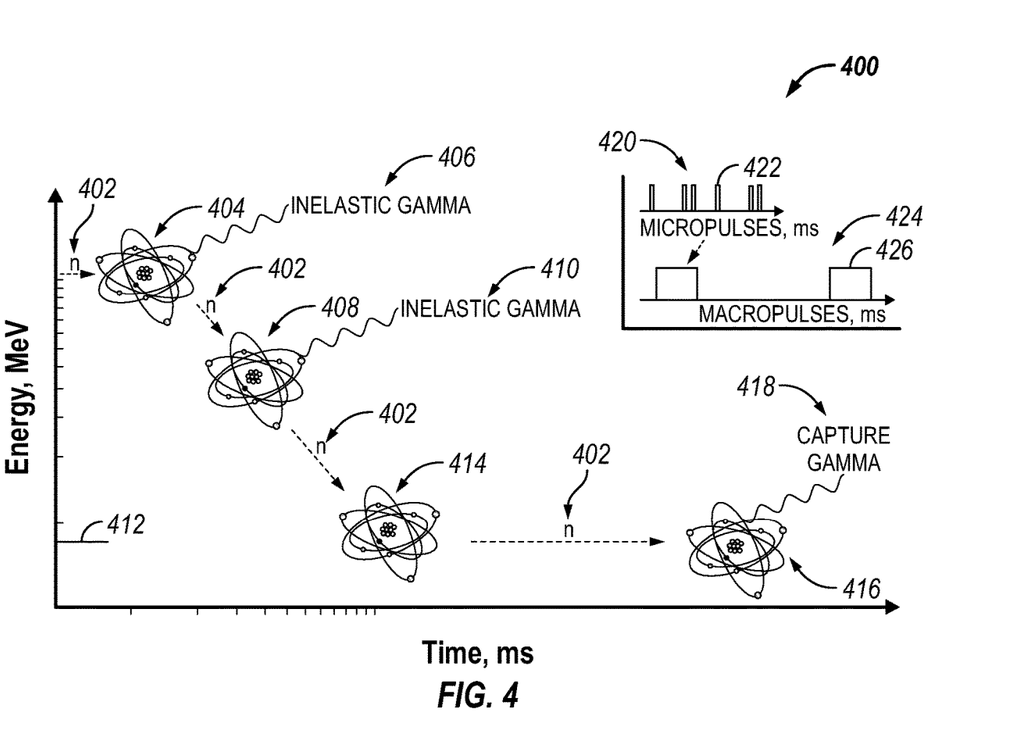
FIG. 4 illustrates the energy of a neutron as it interacts in the present disclosure.

During measurement operations, neutrons emitted from neutron source 110 undergo weak electromagnetic scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. Additionally, neutrons may also undergo an absorption interaction. In most absorption interactions, elastic cross section is nearly constant, whereas the inelastic scattering cross section and absorption cross sections are proportional to the reciprocal of the neutrons speed. Referring to FIG. 4, heavy nuclei 420 have large and narrow resonances 422 that appears for neutrons in the eV range, whereas light nuclei 424 have broad and smaller resonances 426 that appear in the MeV.

FIG. 4 illustrates a graph 400 that depicts different scattering by a neutron 402. As illustrate, neutron 402 may be traveling at a fast speed with high kinetic energy and interacts with nuclei 404, releasing inelastic gamma 406 and lowering the energy state of neutron 402. After the interaction, neutron 402 contains too much energy to be absorbed, thus continues its path until it interacts with nuclei 408 releasing inelastic gamma 410 and again lowering its energy state again. After the interaction, neutron 402 has the kinetic energy close to target energy 412. Thus, when neutron 402 at target energy 412 interacts with nuclei 414 it will be captured. This interaction results in a rearranged nucleus 416 containing previously traveling neutron 402 and an emitted capture gamma 418. Sensing these events with pulsed-neutron logging tool 102 using first neutron detector 112, second neutron detector 114, and/or gamma ray detector 166 (e.g., referring to FIG. 1) may allow for the identification of oil, gas, and/or water in borehole 104 (e.g., referring to FIG. 1).

During measurement operations, hydrogen, oxygen, and carbon elemental concentrations are indicators of holdup. Based on physics and interaction mechanism, identifying characteristic features that uniquely correlate holdup, regardless of borehole and formation variations, allow for the identification and location of a holdup in a borehole 104. Discussed further below, pulsed-neutron logging tool 102 may perform measurements that may take inelastic gamma spectrum measurements, capture gamma spectrum measurement, and/or time-decay spectrum measurements of captured gammas, which may be utilized to identify a holdup and the location of the hold up.

Phenomenologically, each measurement is unique for each holdup. However, it is often necessary to reduce the number of features when the measurement is statistical in nature. Features are identified by measurements taken in a general gamma spectrum that may range from 256 to 512 channels. These features may be binned to a factor of 10 or less in dimension. Therefore, the above identified measurements are used to find dominant features such as characteristic gamma peaks, ratios or algebraic expressions of ratios, entire spectrum or spectral vector, decay spectrum or decay constant, differential attenuation or electron density index, and/or any combination thereof.

Figure 5:
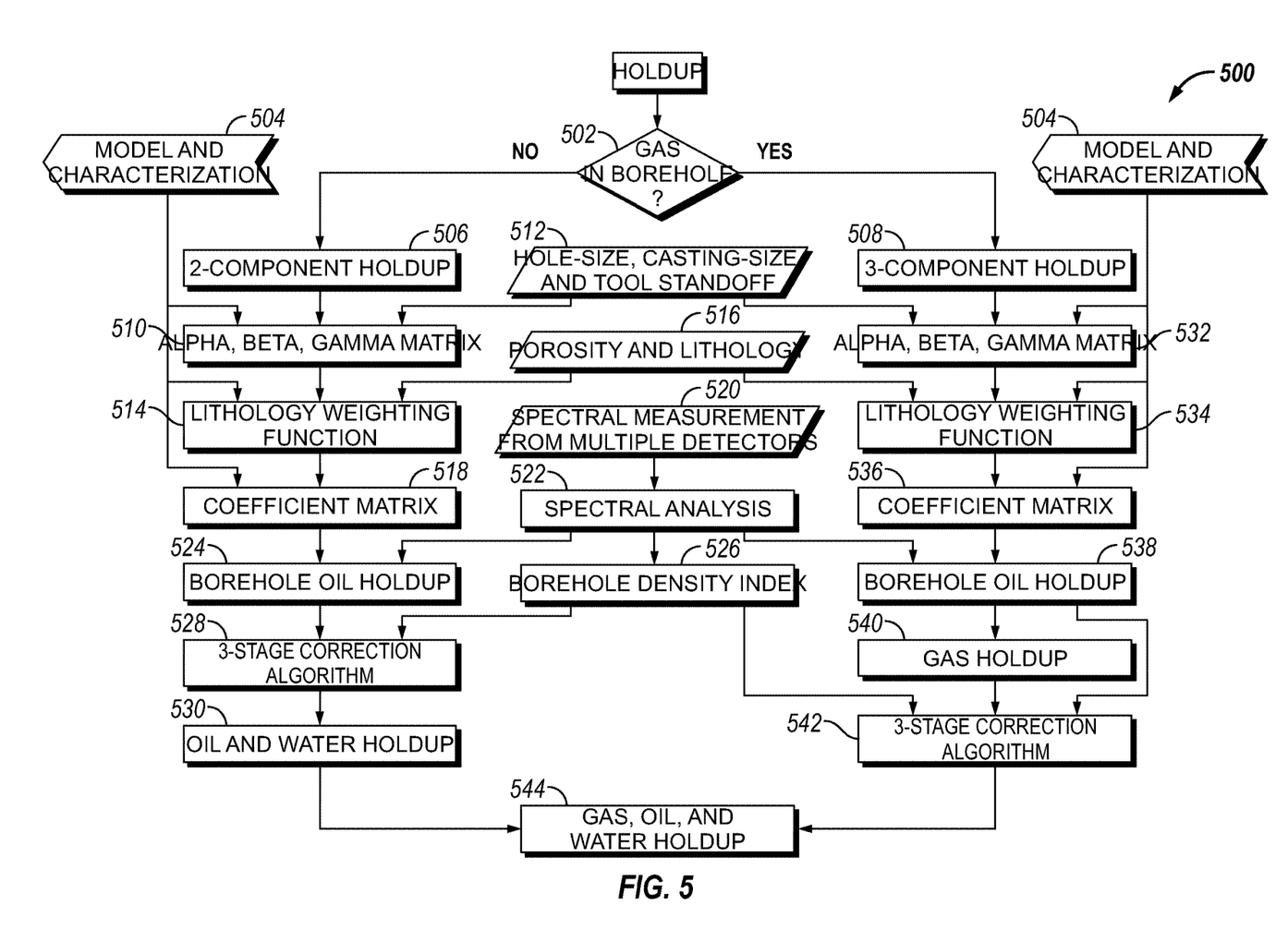
FIG. 5 depicts processing workflow to reach Gas, Oil, and Water Holdup.

FIG. 5 illustrates a workflow 500 that may be used for identification of a holdup in a borehole 104 (e.g., referring to FIG. 1). Workflow 500 begins with block 502, which identifies if gas is in borehole 104. Specifically, identifying hydrocarbon gas in the form of $C_xH_y$, (i.e. methane is CH4). However, the measurements may also look for any form of gas such as methane, air, or any combination thereof. This may be performed by taking measurements with sensors (a first neutron detector 112, a second neutron detector 114, and a gamma ray detector 166 (e.g., referring to FIG. 1)) disposed on pulsed-neutron logging tool 102 (e.g., referring to FIG. 1) in borehole 104. The identification of gas in borehole 104 identifies if a 2-component holdup measurement is performed or a 3-component holdup measurement is performed. In examples, the selection of 2-component or 3-component holdup measurement is determined by initial user input. If 3-component holdup is chosen, then a continuous holdup solution is utilized based on borehole geometry and tool positioning.

With continued reference to FIG. 5, in blocks 504 modeling and characterization of borehole 104 is performed. This modeling and characterization may be used to determine if gas is in borehole 104. For modeling, a Monte Carlo radiation transport model may be utilized. Model data is trained and characterized to correlate detector response to the holdup. Training may be performed on and by any suitable neural network, machine learning, or artificial intelligence system and/or device. During modeling, borehole conditions may be modeled with various holdup values to generate one or more detector responses. These generated responses, otherwise known as data, may then by utilized to characterize our workflow 500 to predict holdup.

If gas is not in borehole 104, then a 2-component holdup measurement begins with block 506. If gas is in borehole 104, then a 3-component holdup measurement begins with block 508. In block 510, a 2-component holdup measurement begins utilizing an alpha, a beta, and a gamma matrix. The alpha, bets, and gamma matrices may be constructed to correlate holdup responses to borehole size, casing size, and/or formation porosity. The correlation may be performed utilized in the Monte Carlo modeling with any suitable neural network, machine learning, or artificial intelligence system and/or device.

Additionally, pulsed-neutron logging tool 102 (e.g., referring to FIG. 1) position with respect to borehole 104 (e.g., referring to FIG. 1) and formation geometry are older factors that affect holdup measurements. In workflow 500, a continuous answer may be developed based on borehole size, casing size, and tool standoff, which is found in block 512. In examples, borehole size, casing size, and tool standoff may be input values that are placed in a computer model to generate one or more gamma ray detector responses in a computer simulation for block 512. This continuous solution may also be based on physics and semi-analytical formulation. Borehole size, casing size, and tool standoff in block 512 are input into block 510 along with the modeling and characterization in block 504. The information and data from blocks 504 and 512 are parametrized to form alpha, beta, and gamma matrix for integration and interpolation in block 510.

The data from each matrix in block 510 is sent to block 514, wherein a lithology weighting function is prepared and used to average lithology effects in the solution. In order to increase the accuracy of the 2-component holdup measurement, formation variations including formation lithology, porosity, and saturation are accounted for in block 514. Thus, formation effects may be isolated and compensated to deliver accurate holdup measurement. In examples, available open hole data is used to build up lithology and porosity functions in block 516. Additionally, in block 516, porosity measurements and lithology measurements are taken with pulsed-neutron logging tool 102. The measurements from block 514 and the model and characterization from block 504 are fed to block 518. The data and information from the lithology weighting function in block 514 are sent to block 518 to form a coefficient matrix.

In block 518 a coefficient matrix is formed with the model and characterization in block 504 and the data and information in block 514 from the lithology weighting function. A coefficient matrix function is constructed in block 518 combining all available input and spectral. At the same time pulsed-neutron logging tool 102 (e.g., referring to FIG. 1) in block 520 performs spectral measurements from multiple detectors. Spectral measurements may be taken by one or more gamma ray detectors 166 (e.g., referring to FIG. 1) using pulsed-neutron logging tool 102. The spectral measurements are analyzed in block 522. Pulsed-neutron logging tool 102 may emit either 2456 or 512 channel spectra for measurements. These spectra may be processed into reduced bins. Reduced bins are further processed to form features that include ratios, and parameters that may be inserted into workflow 500 for further use.

In block 524, the coefficient matrix from block 518 is used in block 524 along with the spectral data and information from block 522 to compute the identification and location of an oil holdup in borehole 104 (e.g., referring to FIG. 1). Computing the oil holdup is done by inserting the reduced spectral features, discussed above, into workflow 500 with the alpha, beta, and gamma matrices to identify the location of oil holdup. Data and information from the spectral analysis in block 522 is sent to block 526 to determine a borehole density index in block 526 using count rates. The borehole density index includes a borehole density that is correlated to gas volume at a location in borehole 104 (e.g., referring got FIG. 1). The data and information from block 528 is cross-validated with the borehole density index in block 526 to construct a unique improved 2-component holdup solution in block 528 as a 3-stage correction algorithm. Borehole density index may determine if gas phase is present or not. Determination of the presence of gas in borehole 104 identifies if a 2-component algorithm or 3-component algorithm is activated or constructed. The 3-stage correction algorithm in block 528 is used in block 530 to determine oil and water hold up in borehole 104 (as discussed above using spectral measurements to calculate a holdup). The workflow described above may be repeated for a 3-component holdup.

As discussed above, block 502 of workflow 500 may determine if gas is present in borehole 104 (e.g., referring to FIG. 1). If gas is present in borehole 104, then a 3-component holdup measurement begins with block 508. In block 508, a 3-component holdup measurement begins with alpha, beta, and gamma matrix in block 532. Additionally, pulsed-neutron logging tool 102 (e.g., referring to FIG. 1) position with respect to borehole 104 (e.g., referring to FIG. 1) and formation geometry are other factors that affect holdup measurements. In workflow 500, a continuous answer may be developed based on borehole size, casing size, and tool standoff, which is found in block 512. This continuous solution may also be based on physics and semi-analytical formulation. Borehole size, casing size, and tool standoff in block 512 are input into block 532 along with the modeling and characterization in block 504. The information and data from blocks 504 and 512 are parametrized to form alpha, beta, and gamma matrix for integration and interpolation in block 532.

The data from each matrix in block 532 is sent to block 534, wherein a lithology weighting function is prepared and used. In order to increase the accuracy of the 3-component holdup measurement, formation variations including formation lithology, porosity, and saturation are accounted for in block 534. Thus, formation effects may be isolated and compensated to deliver accurate holdup measurement. In examples, available open hole data is used to build up lithology and porosity functions in block 516. Additionally, in block 516, porosity measurements and lithology measurements are taken with pulsed-neutron logging tool 102. The measurements from block 514 and the model and characterization from block 504 are fed to block 536. The data and information from the lithology weighting function in block 534 are sent to block 536 to form a coefficient matrix.

In block 536 a coefficient matrix is formed with the model and characterization in block 504 and the data and information in block 534 from the lithology weighting function. A coefficient matrix function is constructed in block 536 combining all available input and spectral. At the same time pulsed-neutron logging tool 102 in block 520 performs spectral measurements from multiple detectors. The spectral measurements are analyzed in block 522. In blocks 538, the coefficient matrix from block 518 is used in block 524 along with the spectral data and information from block 522 to compute oil holdup in borehole 104 (e.g., referring to FIG. 1). In block 540 the coefficient matrix from block 518 is used in block 524 along with the spectral data and information from block 522 to compute gas holdup in borehole 104. Data and information from the spectral analysis in block 522 is sent to block 526 to determine a borehole density index in block 526. The data and information from block 542 is cross-validated with the borehole density index in block 526 to construct a unique improved 3-component holdup solution in block 542 as a 3-stage correction algorithm. The 3-stage correction algorithm in block 542 is used in block 544 to determine oil, water, and gas holdup in borehole 104.

Improvements from the methods described above may produce an enhanced holdup output which is consistent across all landscapes of operational environments. The application borehole density index provides a unique complement for processing responses from a pulsed neutron logging tool. This processing leads to improved accuracy of measurements, improved generality and applicability of the solution, reduced dependency on rigorous computer simulations, 2 or 3-component holdup solution, and/or a borehole density index. The preceding description provides various examples of the systems and methods of use disclosed herein which may contain different method steps and alternative combinations of components.

Statement 1: A method for identifying a holdup may include identifying if a gas is in a borehole, wherein the gas is a hydrocarbon gas, creating an alpha matrix, a beta matrix, and a gamma matrix from a model and a characterization of the borehole, taking a porosity measurement and a lithology measurement, creating a lithology weighting function from the porosity measurement and the lithology measurement, and forming a coefficient matrix from the lithology weighting function. The method may further include taking a spectral measurement, performing a spectral analysis on the spectral measurement to form a borehole density index, identifying a location of an oil holdup from the coefficient matrix and the spectral analysis, forming a correction algorithm from the coefficient matrix and the spectral measurement, and cross checking a 3-stage correction algorithm with the borehole density index.

Statement 2. The method of statement 1, further comprising identifying the oil holdup as a 3-composition holdup if the gas is present in the borehole.

Statement 3. The method of statement 2, further comprising identifying an oil location in the borehole from the correction algorithm.

Statement 4. The method of statement 3, further comprising identifying a gas location in the borehole from the correction algorithm.

Statement 5. The method of statements 1 or 2, wherein a hole size of the borehole, a casing-size of the borehole, and a tool standoff in the borehole populate the alpha matrix, the beta matrix, and the gamma matrix.

Statement 6. The method of statements, 1, 2, or 5, further comprising identifying the oil holdup as a 2-composition holdup if the gas is not present in the borehole.

Statement 7. The method of statements 1, 2, 5, or 6, wherein the model is a Monte Carlo radiation transport model.

Statement 8. The method of statements 1, 2, or 5-7, wherein the characterization of the borehole correlates one of more detector responses to the oil holdup.

Statement 9. The method of statements 1, 2, or 5-8, wherein the borehole density index correlates a gas volume to a location within the borehole.

Statement 10. The method of statements 1, 2, or 5-9, wherein the spectral analysis is performed over 256 channels or 512 channels.

Statement 11. A system may include a pulsed-neutron logging tool that further includes a neutron source configured to generating pulses of high energy neutrons, a first neutron detector configured to count one or more thermal neutrons of one or more epithermal neutrons, a second neutron detector configured to count the one or more thermal neutrons of the one or more epithermal neutrons, and a gamma ray detector configured to detect one or more gamma rays. The system may further include an information handling system configured to identify if a gas is in a borehole from measurements taken with the first neutron detector, the second neutron detector, or the gamma ray detector, wherein the gas is a hydrocarbon gas. The information handling system may further be configured to create an alpha matrix, a beta matrix, and a gamma matrix from a model and a characterization of the borehole, take a porosity measurement and a lithology measurement, and create a lithology weighting function from the porosity measurement and the lithology measurement, form a coefficient matrix from the lithology weighting function. Additionally, the information handling system may be configured to take a spectral measurement, perform a spectral analysis on the spectral measurement to form a borehole density index, identify a location of an oil holdup from the coefficient matrix and the spectral analysis, form a correction algorithm from the coefficient matrix and the spectral measurement, and cross check a 3-stage correction algorithm with the borehole density index.

Statement 12. The system of statement 11, wherein the information handling system is further configured to identify the oil holdup as a 3-composition holdup if the gas is present in the borehole.

Statement 13. The system of statement 12, wherein the information handling system is further configured to identify an oil location in the borehole from the correction algorithm.

Statement 14. The system of statement 13, wherein the information handling system is further configured to identify a gas location in the borehole from the correction algorithm.

Statement 15. The system of statements 11 or 12, wherein a hole size of the borehole, a casing-size of the borehole, and a tool standoff in the borehole populate the alpha matrix, the beta matrix, and the gamma matrix.

Statement 16. The system of statements 11, 12, or 15, wherein the information handling system is further configured to identify the oil holdup as a 2-composition holdup if the gas is not present in the borehole.

Statement 17. The system of statements 11, 12, 15, or 16, wherein the model is a Monte Carlo radiation transport model.

Statement 18. The system of statements 11, 12, or 15-17, wherein the characterization of the borehole correlates one of more detector responses to the oil holdup.

Statement 19. The system of statements 11, 12, or 15-18, wherein the borehole density index correlates a gas volume to a location within the borehole.

Statement 20. The system of statements 11, 12, or 15-19, wherein the spectral analysis is performed over 256 channels or 512 channels.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying a holdup comprising:
identifying if a gas is in a borehole, wherein the gas is a hydrocarbon gas;
creating an alpha matrix, a beta matrix, and a gamma matrix from a model and a characterization of the borehole;
taking a porosity measurement and a lithology measurement;
creating a lithology weighting function from the porosity measurement and the lithology measurement;
forming a coefficient matrix from the lithology weighting function;
taking a spectral measurement;
performing a spectral analysis on the spectral measurement to form a borehole density index;
identifying a location of an oil holdup from the coefficient matrix and the spectral analysis;
forming a correction algorithm from the coefficient matrix and the spectral measurement; and
cross checking a 3-stage correction algorithm with the borehole density index.

2. The method of claim 1, further comprising identifying the oil holdup as a 3-composition holdup if the gas is present in the borehole.

3. The method of claim 2, further comprising identifying an oil location in the borehole from the correction algorithm.

4. The method of claim 3, further comprising identifying a gas location in the borehole from the correction algorithm.

5. The method of claim 1, wherein a hole size of the borehole, a casing-size of the borehole, and a tool standoff in the borehole populate the alpha matrix, the beta matrix, and the gamma matrix.

6. The method of claim 1, further comprising identifying the oil holdup as a 2-composition holdup if the gas is not present in the borehole.

7. The method of claim 1, wherein the model is a Monte Carlo radiation transport model.

8. The method of claim 1, wherein the characterization of the borehole correlates one of more detector responses to the oil holdup.

9. The method of claim 1, wherein the borehole density index correlates a gas volume to a location within the borehole.

10. The method of claim 1, wherein the spectral analysis is performed over 256 channels or 512 channels.

11. A system comprising:
a pulsed-neutron logging tool comprising:
a neutron source configured to generating pulses of high energy neutrons;
a first neutron detector configured to count one or more thermal neutrons of one or more epithermal neutrons;

a second neutron detector configured to count the one or more thermal neutrons of the one or more epithermal neutrons; and a gamma ray detector configured to detect one or more gamma rays; and an information handling system configured to:
- identify if a gas is in a borehole from measurements taken with the first neutron detector, the second neutron detector, or the gamma ray detector, wherein the gas is a hydrocarbon gas;
- create an alpha matrix, a beta matrix, and a gamma matrix from a model and a characterization of the borehole;
- take a porosity measurement and a lithology measurement;
- create a lithology weighting function from the porosity measurement and the lithology measurement;
- form a coefficient matrix from the lithology weighting function;
- take a spectral measurement;
- perform a spectral analysis on the spectral measurement to form a borehole density index;
- identify a location of an oil holdup from the coefficient matrix and the spectral analysis;
- form a correction algorithm from the coefficient matrix and the spectral measurement; and
- cross check a 3-stage correction algorithm with the borehole density index.

12. The system of claim 11, wherein the information handling system is further configured to identify the oil holdup as a 3-composition holdup if the gas is present in the borehole.

13. The system of claim 12, wherein the information handling system is further configured to identify an oil location in the borehole from the correction algorithm.

14. The system of claim 13, wherein the information handling system is further configured to identify a gas location in the borehole from the correction algorithm.

15. The system of claim 11, wherein a hole size of the borehole, a casing-size of the borehole, and a tool standoff in the borehole populate the alpha matrix, the beta matrix, and the gamma matrix.

16. The system of claim 11, wherein the information handling system is further configured to identify the oil holdup as a 2-composition holdup if the gas is not present in the borehole.

17. The system of claim 11, wherein the model is a Monte Carlo radiation transport model.

18. The system of claim 11, wherein the characterization of the borehole correlates one of more detector responses to the oil holdup.

19. The system of claim 11, wherein the borehole density index correlates a gas volume to a location within the borehole.

20. The system of claim 11, wherein the spectral analysis is performed over 256 channels or 512 channels.

* * * * *